US008681357B2

(12) United States Patent
Sato et al.

(10) Patent No.: US 8,681,357 B2
(45) Date of Patent: Mar. 25, 2014

(54) IMAGE FORMING SYSTEM, COMPUTER-READABLE RECORDING MEDIUM STORING DRIVER PROGRAM, AND IMAGE FORMING METHOD FOR REMOTE JOB EXECUTION

(75) Inventors: Masafumi Sato, Osaka (JP); Takashi Oguma, Osaka (JP)

(73) Assignee: KYOCERA Document Solutions Inc. (JP)

( * ) Notice: Subject to any disclaimer, the term of this patent is extended or adjusted under 35 U.S.C. 154(b) by 421 days.

(21) Appl. No.: 12/950,704

(22) Filed: Nov. 19, 2010

(65) Prior Publication Data

US 2011/0122439 A1 May 26, 2011

(30) Foreign Application Priority Data

Nov. 26, 2009 (JP) .................................. 2009-268575

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 726/2; 726/3; 726/4

(58) Field of Classification Search
USPC ...................................................... 358/1.15
See application file for complete search history.

(56) References Cited

U.S. PATENT DOCUMENTS

| 6,163,383 | A | * | 12/2000 | Ota et al. ........................ 358/1.1 |
| 2005/0141012 | A1 | * | 6/2005 | Oomura ....................... 358/1.14 |
| 2007/0216935 | A1 | * | 9/2007 | Osamura et al. .............. 358/1.15 |
| 2007/0229873 | A1 | * | 10/2007 | Kato ............................. 358/1.14 |
| 2007/0273915 | A1 | | 11/2007 | Nakagawa |
| 2008/0178265 | A1 | * | 7/2008 | Tsuchiya et al. .................. 726/3 |
| 2011/0096351 | A1 | | 4/2011 | Nakagawa |

FOREIGN PATENT DOCUMENTS

| JP | 2007-088944 | 4/2007 |
| JP | 2007-245627 | 9/2007 |
| JP | 2007-317137 | 12/2007 |
| JP | 2008-140067 | 6/2008 |

\* cited by examiner

*Primary Examiner* — Huo Long Chen
(74) *Attorney, Agent, or Firm* — McDonnell Boehnen Hulbert & Berghoff LLP

(57) ABSTRACT

If a logged-in user to a host terminal device succeeds in user authentication via a directory server device, a user-manager server device transmits a job ticket and authorization information corresponding to the logged-in user to the host terminal device. The host terminal device receives the job ticket and the authorization information, generates a job execution instruction responsive to the authorization information, and transmits the generated job execution instruction to an image forming apparatus along with the job ticket. When the job execution instruction is received from the host terminal device, the image forming apparatus executes a job specified by the job execution instruction if the job ticket received along with the job execution instruction is determined to be valid.

15 Claims, 8 Drawing Sheets

IMAGE FORMING SYSTEM, COMPUTER-READABLE RECORDING MEDIUM STORING DRIVER PROGRAM, AND IMAGE FORMING METHOD FOR REMOTE JOB EXECUTION

INCORPORATION BY REFERENCE

This application is based upon and claims the benefit of priority from corresponding Japanese Patent Application No. 2009-268575, filed in the Japan Patent Office on Nov. 26, 2009, the entire contents of which is incorporated by reference herein.

BACKGROUND

1. Field of the Invention

The present invention relates to an image forming system, a computer-readable recording medium storing driver program, and an image forming method.

2. Description of the Related Art

In recent years, directory services such as Active Directory and e-Directory have been introduced in order to manage users and devices in a network system. Some image forming apparatuses such as a printer, a copier, and a multifunction peripheral (MFP) have a network function, which performs management of users and groups by the directory service. To perform the management of the users by the directory service, a user authentication for a user who has performed a login operation to the image forming apparatus is performed on the server device for the directory service.

On the image forming apparatus, an authorization process using only a function permitted to a logged-in user among various functions is performed. In the authorization process, authorization information specifying a function which is permitted or prohibited for use has been previously set on the image forming apparatus for each user, and some functions to be used by the logged-in user are limited by the authorization information.

In addition, there is a system providing the image forming apparatus with the authorization information corresponding to the logged-in user, by an intermediate server device including the authorization information for each user. In this system, the intermediate server device performs centralized management of the authorization information for each user, but it is difficult to flexibly set the authorization information on users and groups.

For example, in a case of setting the authorization information on a group different from a domain group in the directory service, the authorization information cannot be set collectively, and hence the authorization information must be set for each of a plurality of users belonging to the group. This makes the process of setting up the authorization information more complicated. It is possible to additionally set the authorization information in the directory service on a group basis, but this raises a fear that bad influences may be exerted upon the directory service that is already in operation in a company or the like.

In the system, the image forming apparatus obtains the authorization information on the user who executes a job from the intermediate server device. Therefore, in the case of causing the image forming apparatus to execute the job via the network from the host terminal device, the user cannot be identified unless the user has logged in to the image forming apparatus, and hence it is difficult to acquire the authorization information. Accordingly, in the case of causing the image forming apparatus to execute the job via the network from the host terminal device, the user needs to have logged in to the image forming apparatus by transmitting the user authentication information (such as a password) from the host terminal device to the image forming apparatus.

However, it is not preferred in terms of security to transmit such user authentication information via the network. Further, in the system, it is necessary to log in to the intermediate server device at first, and hence it is necessary to log in twice in total to both the intermediate server device and the image forming apparatus in order to cause the image forming apparatus to execute a job via the network from the host terminal device.

SUMMARY

The present disclosure relates to an image forming system that may limit a function used by an image forming apparatus according to authorization information while maintaining security and may cause one login process to be necessary in executing a job on the image forming apparatus via a network from a host terminal device, and also relates to a computer-readable recording medium that stores a driver program.

An image forming system according to one aspect of the present disclosure includes: an image forming apparatus coupled to a network, a host terminal device coupled to the network configured to cause the image forming apparatus to execute a job, and a user-manager server device coupled to the network and including authorization information on one of a group and a user. If authentication of the logged-in user to the host terminal device is successful, the user-manager server device transmits to the host terminal device a job ticket indicating one or more job execution permissions on the image forming apparatus for a logged-in user and the authorization information corresponding to the logged-in user. The host terminal device generates a job execution instruction corresponding to the authorization information, and transmits the job execution instruction and the job ticket to the image forming apparatus. The image forming apparatus executes the job specified by the job execution instruction if the job ticket is valid.

According to another aspect of the present disclosure, there is provided a computer-readable recording medium that stores a driver program to be installed on a host terminal device that causes an image forming apparatus to execute a job via a network. The driver program controls a computer within the host terminal device to function as: a ticket processing unit configured to if authentication of the logged-in user to the host terminal device is successful, receive a job ticket indicating one or more job execution permissions on the image forming apparatus and authorization information corresponding to a logged-in user from a user-manager server device coupled to the network that includes authorization information on one of a group and a user, and a job processing unit configured to (i) generate a job execution instruction responsive to the authorization information, (ii) transmit the job execution instruction and the job ticket to the image forming apparatus, and (iii) cause the image forming apparatus to execute the job.

An image forming method according to another aspect of the present disclosure includes: transmitting, via a host terminal device coupled to a network, a request to issue a job ticket to a user-manager server device via the network when a job request made by a logged-in user is detected by a driver, verifying, via a directory server device coupled to the network, whether or not authentication of the logged-in user has been successful, if the authentication is successful, generating, via the user-manager server device, the job ticket of the logged-in user and transmitting the job ticket and authorization information corresponding to the logged-in user to the host terminal device via the network, generating, via the host terminal device, a job execution instruction responsive to the authorization information and transmitting the job execution instruction and the job ticket to an image forming apparatus, and if the job ticket is valid, executing, via the image forming apparatus, a job specified by the job execution instruction.

DETAILED DESCRIPTION

Figure 1:
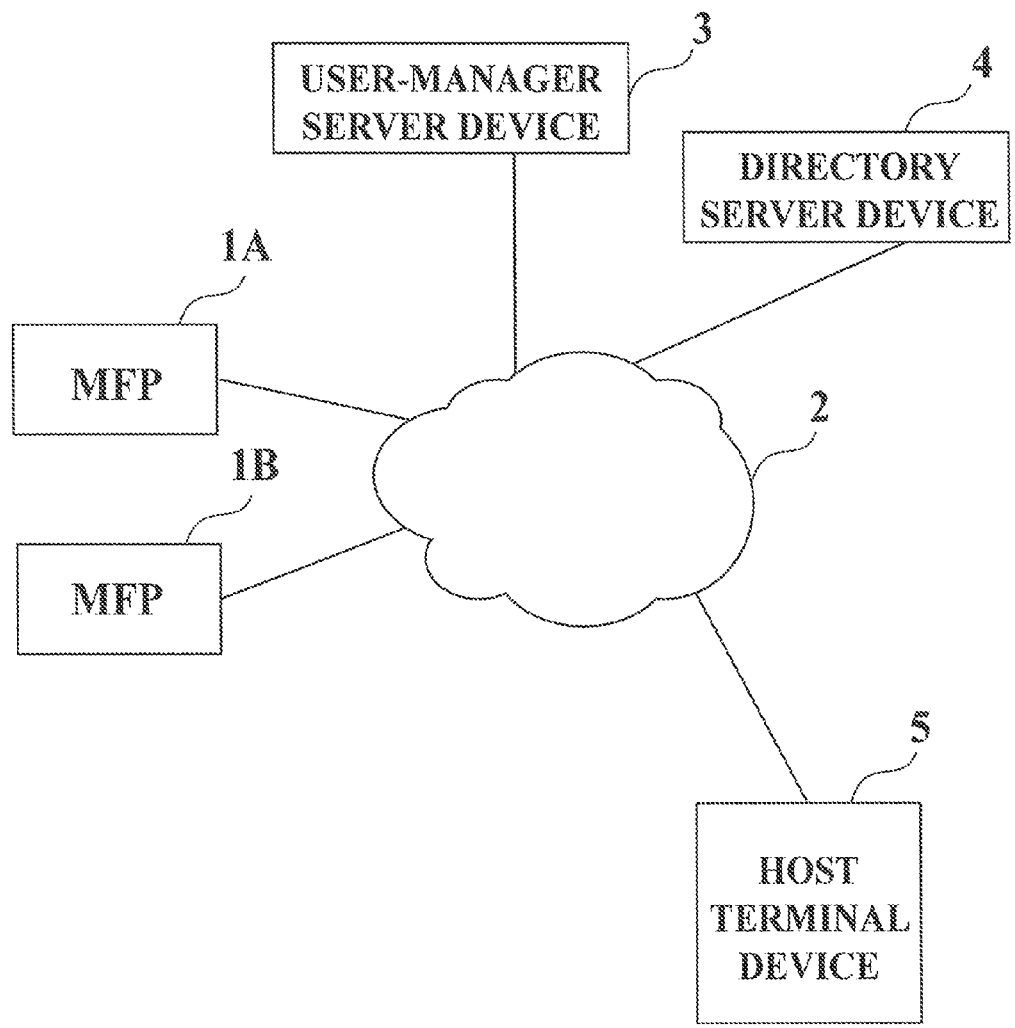
FIG. 1 is a block diagram illustrating a configuration of an image forming system according to an embodiment of the present disclosure.

FIG. 1 is a block diagram illustrating a configuration of an image forming system according to an embodiment of the present disclosure. A plurality of multifunction peripherals (MFPs) 1A and 1B are connected to a network 2. Further connected to the network 2 are a user-manager server device 3, a directory server device 4, and a host terminal device 5.

The MFP 1A is an image forming apparatus having a printer function, a scanner function, a copy function, a facsimile function, and the like, that uses those functions to execute various kinds of jobs responsive to receiving an instruction from an operation panel on the MFP 1A or from a host terminal device connected to the network 2. The MFP 1B is an image forming apparatus having a same or similar configuration.

The user-manager server device 3 receives a user authentication request from the MFPs 1A and 1B, and provides authorization information corresponding to a logged-in user to the MFPs 1A and 1B. The directory server device 4 provides a directory service such as Active Directory or e-Directory.

Figure 2:
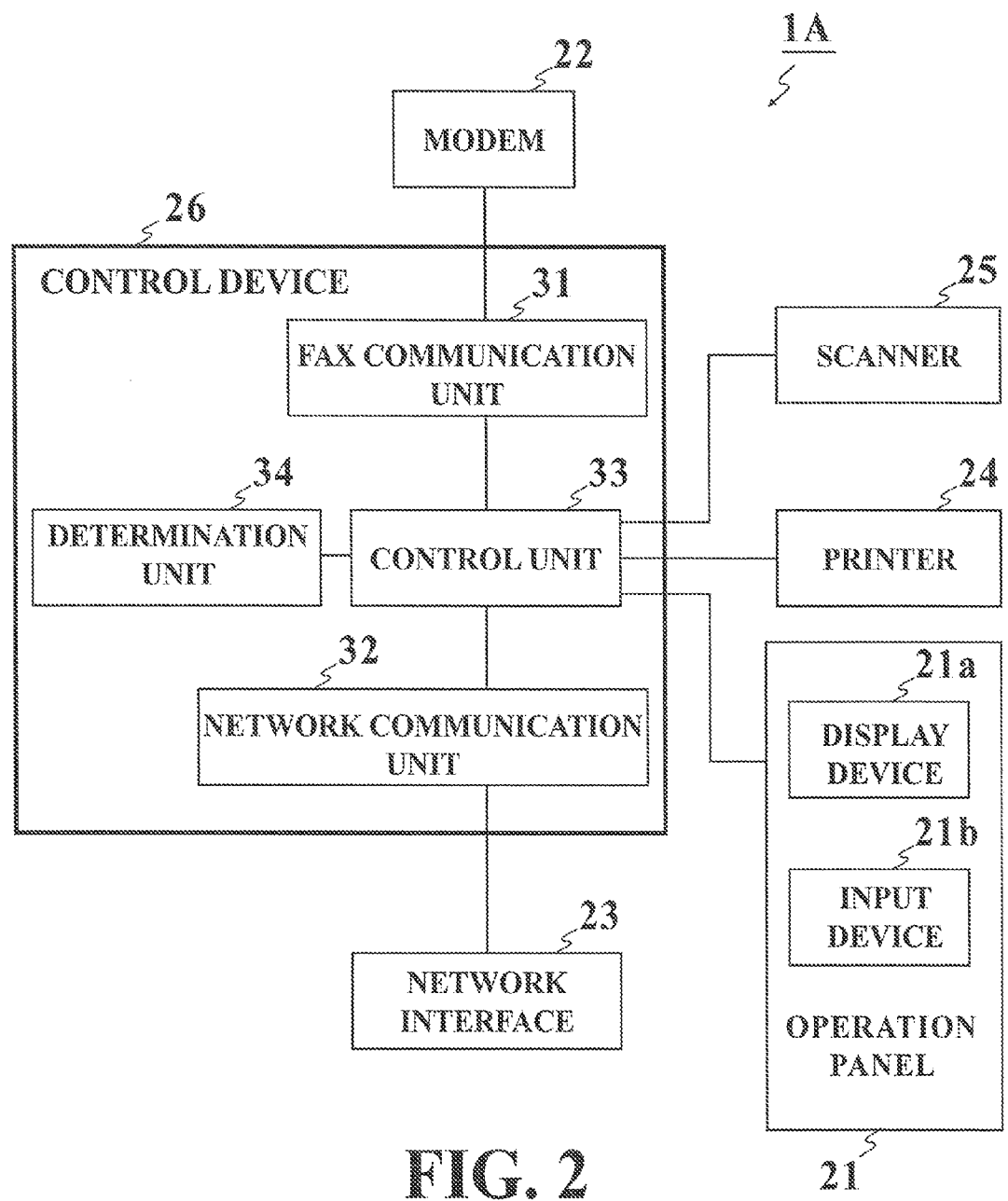
FIG. 2 is a block diagram illustrating a configuration of a multifunction peripheral (MFP)

FIG. 2 is a block diagram illustrating a configuration of the MFP 1A of FIG. 1. The MFP 1B includes a same or similar configuration. The MFP 1A includes an operation panel 21, a modem 22, a network interface 23, a printer 24, a scanner 25, and a control device 26.

The operation panel 21 is installed onto the MFP 1A, and includes a display device 21a that presents various kinds of information to the user and an input device 21b that receives a user operation. The display device 21a may include, for example, a liquid crystal display and various kinds of indicators. The input device 21b may include, for example, a touch panel and key switches.

The modem 22 is a communication device that is connected to a subscriber's telephone line network such as a public switched telephone network (PSTN) and performs transmission/reception of facsimile data.

The network interface 23 is connected to the computer network 2 in a wired and/or wireless manner, and performs data communications with other devices (for example, the user-manager server device 3 and the host terminal device 5) connected to the network 2.

The printer 24 performs printing on a paper sheet responsive to a print request and delivers a printed paper sheet. In an electro photographic process, by causing a light source to emit light based on printing data after charging a photoconductor drum, the printer 24 forms an electrostatic latent image on the photoconductor drum surface, develops the electrostatic latent image via toner, transfers the developed toner image onto the paper sheet, fixes the toner image, and delivers the printed paper sheet to an output tray.

The scanner 25 applies light to one side surface or both side surfaces of a document fed from an automatic document feeder or a document placed by the user, receives reflected light, and outputs corresponding image data reflecting the contents of the document.

The control device 26 controls processing units of the MFP 1A and performs data processing. The control device 26 is configured as a computer including, for example, a central processing unit (CPU), a read only memory (ROM), and a random access memory (RAM). On the control device 26, the CPU implements various kinds of processing units by loading a program stored in the ROM or other storage device (for example, a flash memory) into the RAM and executing the program. The control device 26 implements a FAX communication unit 31, a network communication unit 32, a control unit 33, and a determination unit 34.

The FAX communication unit 31 controls the modem 22 to receive the facsimile data. After receiving of the facsimile data, the FAX communication unit 31 supplies a corresponding print request to the control unit 33.

The network communication unit 32 controls the network interface 23 to perform data communications with the devices on the network 2 using various kinds of communication protocols. For example, the network communication unit 32 transmits, to the user-manager server device 3, a user name (user ID) and a password input through the operation panel 21 upon user login, and receives the authorization information corresponding to the logged-in user from the user-manager server device 3. Further, the network communication unit 32 receives the print request for page description language (PDL) data or the like from the host device, and supplies the print request to the control unit 33.

The control unit 33 receives a job request in response to a user operation with respect to the operation panel 21 or a job execution instruction received from the host terminal device 5 by the network interface 23 and the network communication unit 32, and controls the units within the MFP 1A to execute a job corresponding to the job request. The job execution instruction may include a print request, a scan request, and/or a facsimile transmission request. Further, when there occurs a login operation on the operation panel 21, the control unit 33 causes the network communication unit 32 to request a user authentication, authorization information, and the like from the user-manager server device 3. Further, when a job execution instruction is received from the host terminal device 5, the control unit 33 determines whether or not a job ticket received along with the job execution instruction is valid, and only if the job ticket is valid, executes the job (such as printing, scanning, or facsimile transmission) specified by the job execution instruction. It should be noted that the job ticket is data indicating permissions for jobs to be performed on the MFP 1A and/or 1B.

For example, the control unit 33 may receive a user name (user ID) along with a job execution instruction, transmit the user name (user ID) and a job ticket to the user-manager server device 3, cause the user-manager server device 3 to verify whether or not the job ticket has been issued to the user name, receive a verification result from the user-manager server device 3, and determine whether or not the job ticket is valid based on the verification result. Further, the control unit 33 may receive the user name (user ID) along with the job execution instruction, perform a predetermined calculation, and determine whether or not the job ticket has been issued to the user of the user name (user ID). For example, when the job ticket is a value of a predetermined function (hash function, encryption function, or the like) using the user name (user ID) as a variable, if the value of the same function obtained from the received user name (user ID) matches the value of the received job ticket, it may be determined that the job ticket has been issued to the user of the user name (user ID).

Based on the authorization information corresponding to the logged-in user received from the user-manager server device 3 through the network interface 23 and the network communication unit 32, the determination unit 34 specifies a function which is prohibited or permitted for use by the logged-in user from among the functions that the MFP 1A provides, and stores data indicating whether or not the use of each of the functions is permitted in the RAM. The control unit 33 references the data to limit the use of the MFP 1A by the logged-in user. For example, when the use of a color copy function is limited for a particular logged-in user, a menu of the copy function may be displayed on the operation panel 21 so as to prevent the color copy function from being chosen by the particular logged-in user. For example, a button for choosing a color copy may be grayed out.

Figure 3:
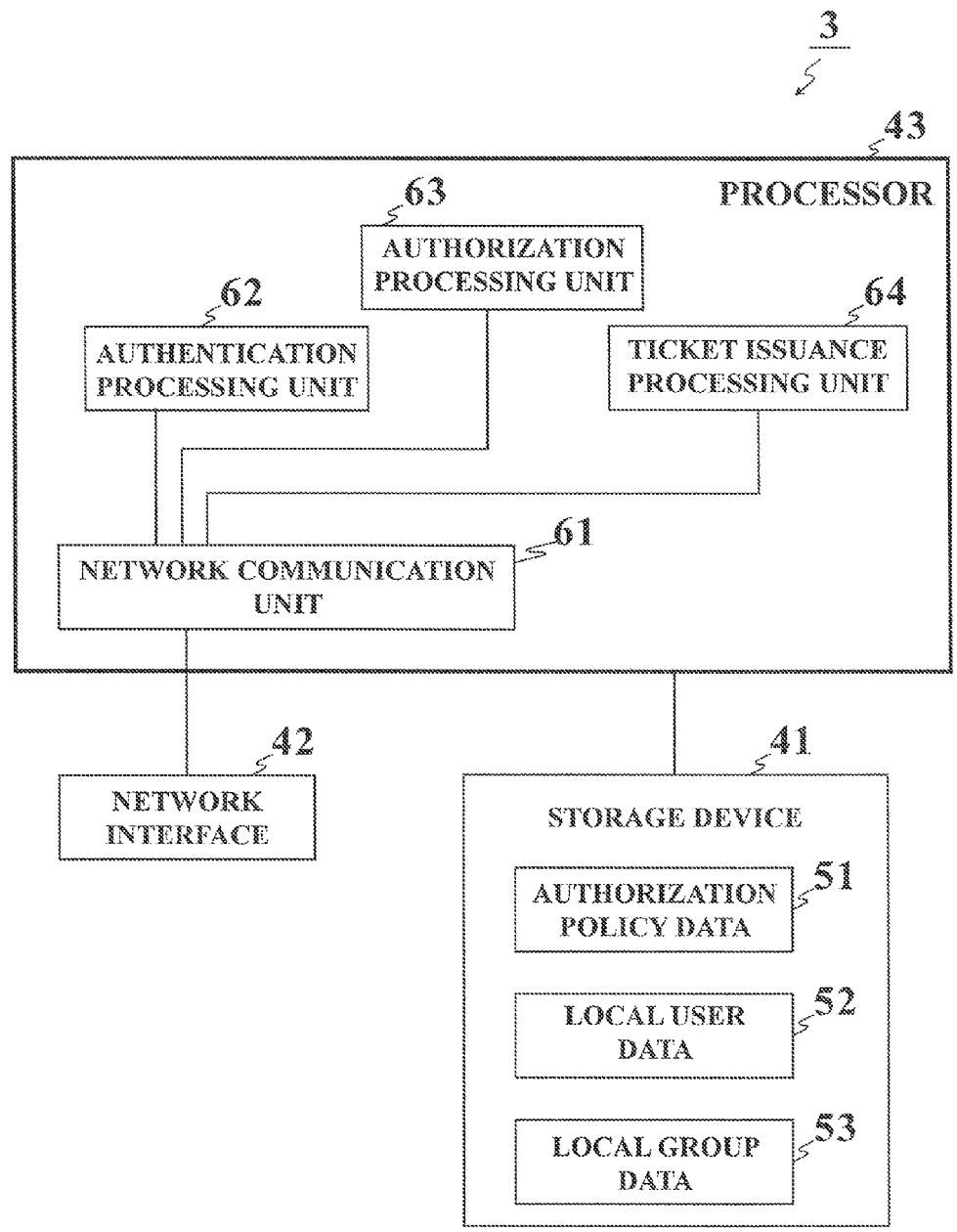
FIG. 3 is a block diagram illustrating a configuration of a user-manager server device.

FIG. 3 is a block diagram illustrating a configuration of the user-manager server device 3 of FIG. 1. The user-manager server device 3 includes a storage device 41, a network interface 42, and a processor 43.

The storage device 41 stores a program and data. The storage device 41 may include a nonvolatile semiconductor memory, a hard disk drive, or the like. The storage device 41 may store authorization policy data 51, local user data 52, and local group data 53.

The authorization policy data 51 includes authorization information data having the authorization information used for specifying the function which is permitted for use by the logged-in user at the MFPs 1A and/or 1B. The authorization policy data 51 includes the authorization information on a user and/or group basis. The authorization information on users may be applied to a user, and the authorization information on groups may be applied to a user belonging to a group. As the authorization information on users, the authorization policy data 51 includes the authorization information on domain users registered on the directory server device 4 and/or the authorization information on local users registered on the user-manager server device 3. As the authorization information on groups, the authorization policy data 51 includes the authorization information on domain groups registered on the directory server device 4 and/or the authorization information on local groups registered on the user-manager server device 3. The authorization information on users may include an ID of a user and information on a function (for example, an ID of the function) which is permitted or prohibited for use by the user. The authorization information on groups includes an ID of a group and information on a function (for example, an ID of the function) which is permitted or prohibited for use by a user belonging to the group. For example, the function which is permitted or prohibited for use may include upper-level functions such as printing, scanning, copying, facsimile transmission, and/or lower-level items (for example, a color/black choosing function) accompanying each of the upper-level items.

Figure 4:
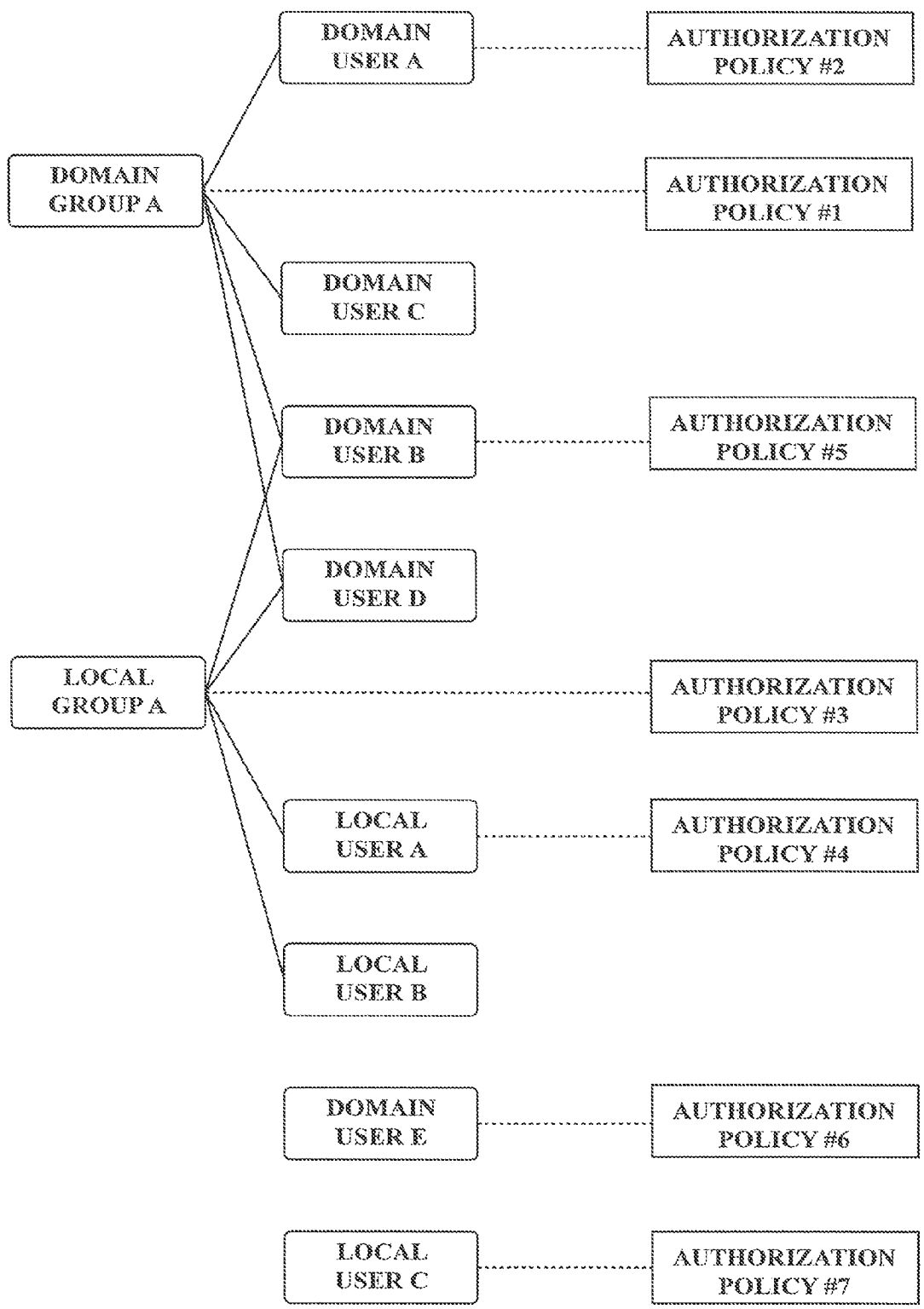
FIG. 4 is a diagram illustrating a structural example of authorization policy data.

FIG. 4 is a diagram illustrating a structural example of the authorization policy data 51 of FIG. 3.

As shown in FIG. 4, a domain group A includes domain users A, B, C, and D. A local group A includes local users A and B and domain users B and D. An authorization policy #1 (policy data including authorization information) is set for the domain group A. An authorization policy #2 is set for the domain user A belonging to the domain group A. An authorization policy #3 is set for the local group A. An authorization policy #4 is set for the local user A belonging to the local group A. An authorization policy #5 is set for the domain user B belonging to the domain group A. An authorization policy #6 is set for a domain user E. An authorization policy #7 is set for a local user C.

The local user data 52 is registration information data including the authentication information on local users (for example, the user ID and the password). The local user is registered on the user-manager server device 3 separately from the domain user registered on the directory server device 4.

The local group data 53 is registration information data including the authentication information on local groups (the group ID and the user IDs of the users belonging to the group). The local group is registered on the user-manager server device 3 separately from the domain group registered on the directory server device 4. The local group includes the local users and the domain users. In other words, the local group consisting of only the local users, the local group consisting of only the domain users, and the local group consisting of the local users and the domain users are set.

The network interface 42 is connected to the computer network 2 in a wired and/or wireless manner, and performs data communications with other devices (for example, MFPs 1A and 1B and directory server device 4) connected to the network 2.

The processor 43 is configured as a computer including a CPU, a ROM, and a RAM, and implements various kinds of processing units by loading a program stored in the ROM or the storage device 41 into the RAM and causing the CPU to execute the program. The processor 43 implements a network communication unit 61, a user authentication processing unit 62, an authorization processing unit 63, and a job ticket issue processing unit 64.

The network communication unit 61 controls the network interface 42 to perform data communications with the devices on the network 2 using various kinds of communication protocols. The network communication unit 61 may receive the user name (user ID) and the password from the MFP 1A, and transmit the authorization information on the user to the MFP 1A. The network communication unit 61 may also transmit the user authentication request to the directory server device 4, and receive an authentication result and user information from the directory server device 4.

The user authentication processing unit 62 uses the network interface 42 to cause the directory server device 4 to perform authentication of the logged-in users to the MFPs 1A and/or 1B.

When the logged-in user to the MFP 1A and/or the MFP 1B who has succeeded in the user authentication belongs to the local group, the authorization processing unit 63 extracts the authorization information on local groups from the authorization policy data 51, and transmits the authentication information as the authorization information corresponding to the logged-in user to the MFP 1A and/or the MFP 1B through the network interface 42. On the other hand, when the logged-in user who has succeeded in the user authentication does not belong to any local group, the authorization processing unit 63 extracts the authorization information on domain users or domain groups to which the logged-in user belongs from the authorization policy data 51, and transmits the authentication information as the authorization information corresponding to the logged-in user to the MFP 1A and/or the MFP 1B through the network interface 42.

For example, in the case of FIG. 4, when the domain user A logs in to the MFP 1A, the authorization policy #2 and the authorization policy #1 are transmitted to the MFP 1A. If a conflict occurs between the authorization information on the user and on the group (for example, authorization policy #2 and authorization policy #1), the predetermined authorization information on the groups or users is applied.

When the domain user B logs in to the MFP 1A, the authorization policy #5, the authorization policy #3, and the authorization policy #1 are transmitted to the MFP 1A. If a conflict occurs between the authorization information on domain groups and local groups (for example, authorization policy #1 and authorization policy #3), the predetermined authorization information on domain groups or local groups is applied.

When the domain user C logs in to the MFP 1A, the authorization policy #1 is transmitted to the MFP 1A. Further, when the domain user D logs in to the MFP 1A, the authorization policy #1 and the authorization policy #3 are transmitted to the MFP 1A.

When the domain user E logs in to the MFP 1A, the authorization policy #6 is transmitted to the MFP 1A.

When the local user A logs in to the MFP 1A, the authorization policy #4 and the authorization policy #3 are transmitted to the MFP 1A.

When the local user B logs in to the MFP 1A, the authorization policy #3 is transmitted to the MFP 1A.

When the local user C logs in to the MFP 1A, the authorization policy #7 is transmitted to the MFP 1A.

It should be noted that, when there is a plurality of authorization information to be applied to the logged-in user, the authorization processing unit 63 may generate user-authorization information that permits the use of the function which is permitted for use by any one of the authorization information. In other words, the authorization processing unit 63 may generate user-authorization information that prohibits the use of the function which is prohibited for use by at least one of the authorization information.

If an issuance request for a job ticket is received from the host terminal device 5 operated by a logged-in user to the host terminal device 5 after the logged-in user has succeeded in the user authentication on the directory server device 4, the ticket issuance processing unit 64 generates the job ticket and transmits the job ticket and the authorization information applied to the logged-in user to the host terminal device 5. It should be noted that, the issuance request for the job ticket made by the user who has not succeeded in the user authentication on the directory server device 4 is rejected. Further, in place of the ticket issuance processing unit 64, the authorization processing unit 63 may transmit the authorization information applied to the logged-in user to the host terminal device 5.

For example, the ticket issuance processing unit 64 may use a predetermined function to generate a job ticket unique to the user from the user name (user ID). Further, for example, the ticket issuance processing unit 64 may use a predetermined function to generate the job ticket unique to the user from the user name (user ID) and one-time data (single-use information). For example, a hash function may be used as the predetermined function. Information that changes each time the job ticket is issued may be used as the one-time data, such as information including a serial number having a date and/or time of the issuance of the request for the job ticket or job ticket generation.

It should be noted that, in a system in which the MFP 1A or 1B inquires about validity of the job ticket from the user-manager server device 3, the ticket issuance processing unit 64 may save the generated job ticket in the storage device 41 in association with the user name (user ID) of the issuance destination of the job ticket. When the inquiry is received, if the job ticket of a user that the inquiry has been made is saved in the storage device 41, the ticket issuance processing unit 64 may return to the MFP 1A and/or 1B the verification result indicating that the job ticket is valid, and delete/nullify the job ticket from the storage device 41. This allows the user to use the job ticket, which has been issued to the user, for the job execution on the MFP 1A and/or 1B only once.

Figure 5:
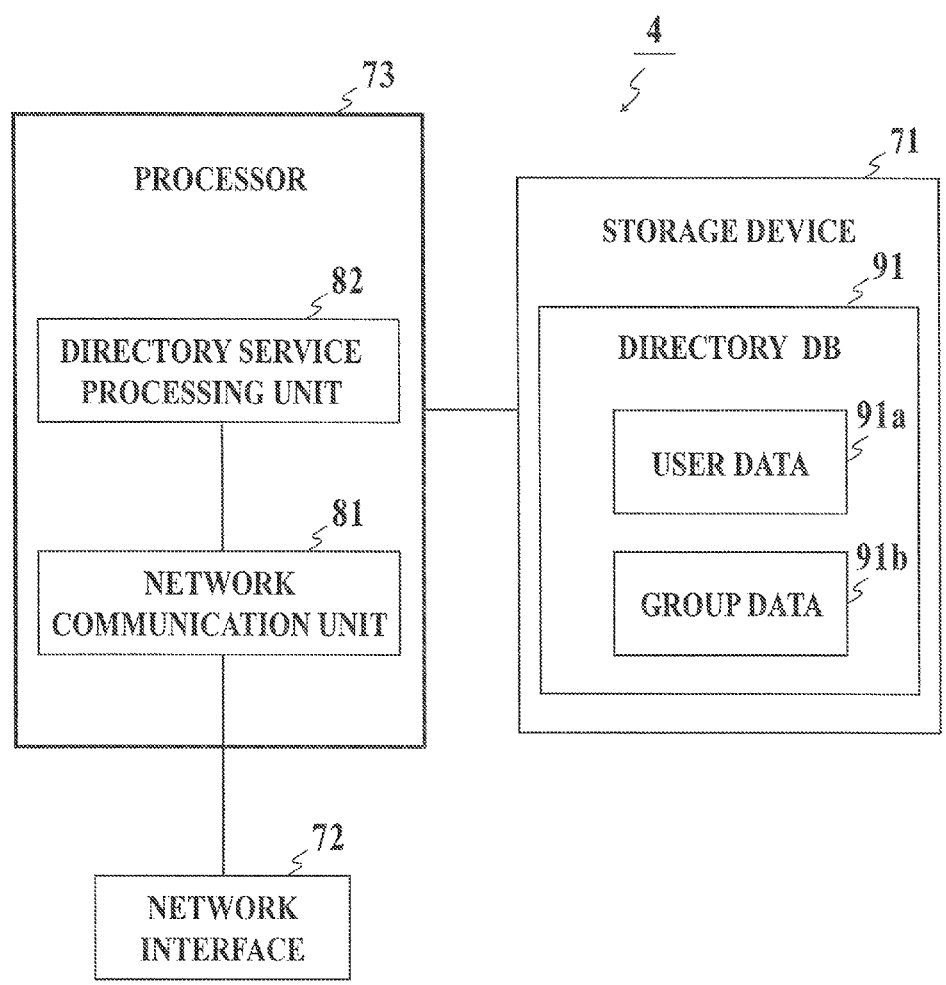
FIG. 5 is a block diagram illustrating a configuration of a directory server device.

FIG. 5 is a block diagram illustrating a configuration of the directory server device 4 of FIG. 1. The directory server device 4 includes a storage device 71, a network interface 72, and a processor 73.

The storage device 71 stores a program and data. The storage device 71 may be, for example, a nonvolatile semiconductor memory, a hard disk drive, or the like. A directory database (DB) 91 for a directory service is built on the storage device 71. The directory database 91 may include user data 91*a* and group data 91*b*. The user data 91*a* may include registration information data having authentication information (for example, the user ID and the password) and user information (for example, contact information such as a telephone number, a facsimile transmission number, or an electronic mail address and other attribute information). The group data 91*b* may include registration information data having the authentication information (for example, a group ID, user IDs of users belonging to the group) and group information (for example, contact information, a manager, and other attribute information).

The network interface 72 is connected to the computer network 2 in a wired or wireless manner, and performs data communications with other devices (for example, the user manager server device 3) connected to the network 2.

The processor 73 includes a CPU, a ROM, and a RAM, and implements various processing units by loading a program stored in the ROM or the storage device 71 into the RAM and causing the CPU to execute the program. For example, the processor 73 may implement a network communication unit 81 and a directory service processing unit 82.

The network communication unit 81 controls the network interface 72 to perform data communications with the devices on the network 2 using various kinds of communication protocols. For example, the network communication unit 81 may receive the user authentication request, and transmit the authentication result and the user information.

The directory service processing unit 82 manages the domain user and the domain group. The directory service processing unit 82 performs registration and deletion of the domain user and the domain group, user authentication, and provision of the user information on the domain user and the group information on the domain group. The user authentication may include lightweight directory access protocol (LDAP) authentication, Kerberos authentication, or the like.

When a directory service is Active Directory, the directory service processing unit 82 may operate as a domain controller.

Figure 6:
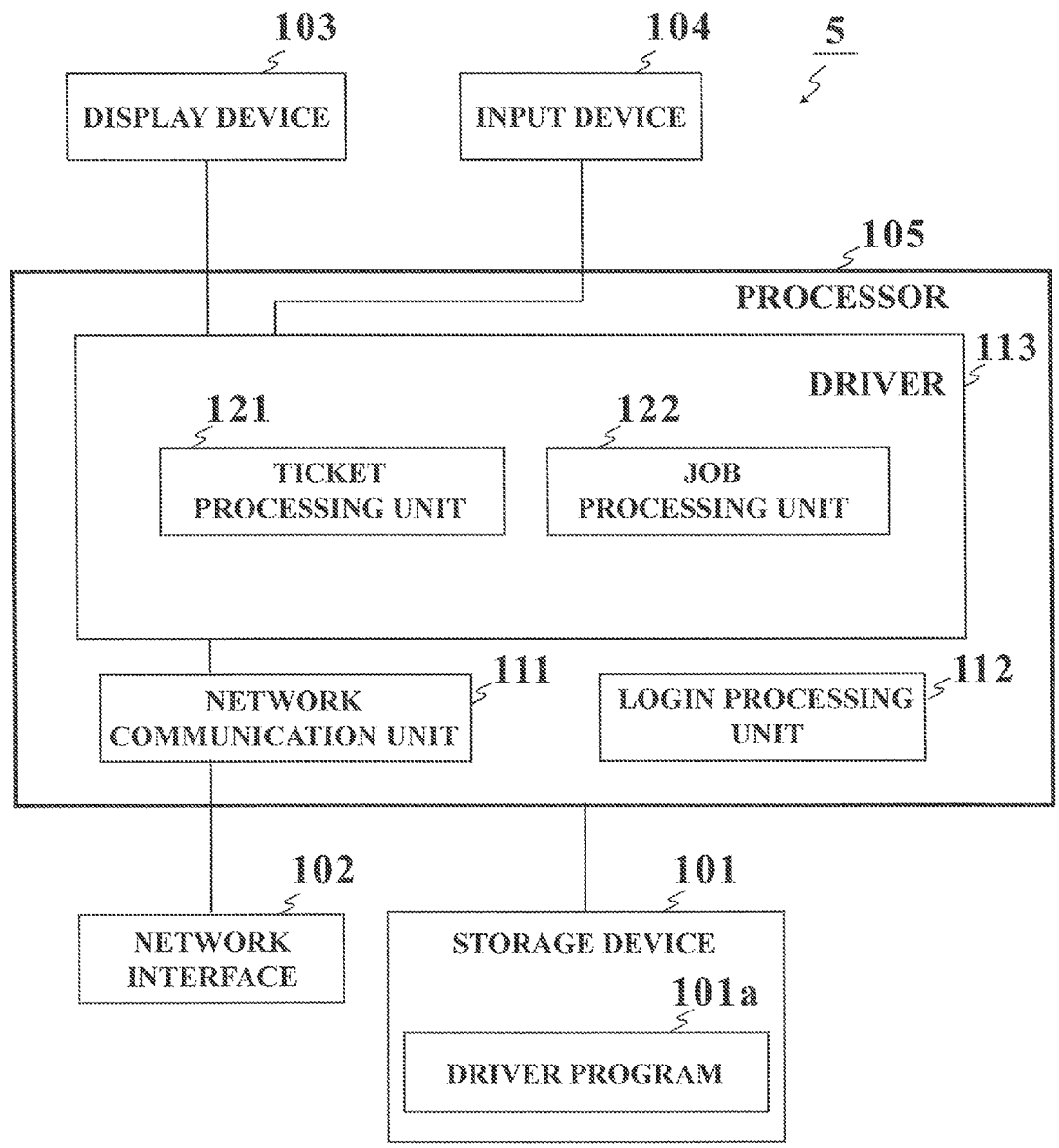
FIG. 6 is a block diagram illustrating a configuration of a host terminal device.

FIG. 6 is a block diagram illustrating the configuration of the host terminal device 5 of FIG. 1. The host terminal device 5 includes a storage device 101, a network interface 102, a display device 103, an input device 104, and a processor 105. The host terminal device 5 may be, for example, a personal computer in which predetermined programs such as an operating system and driver programs are installed.

The storage device 101 stores a program and data. The storage device 101 may include a nonvolatile semiconductor memory, a hard disk drive, or the like. The storage device 101 stores a driver program 101a.

The network interface 102 is connected to the computer network 2 in a wired and/or wireless manner, and performs data communications with other devices (for example, the MFP 1A or 1B, the user manager server device 3, and the directory server device 4) connected to the network 2.

The display device 103 (for example, a liquid crystal display) displays various kinds of information to the user. The input device 104 (for example, a keyboard and/or a mouse) receives a user operation, and outputs an electrical signal corresponding to the user operation to the processor 105.

The processor 105 is configured as a computer including a CPU, a ROM, and a RAM, and implements various processing units by loading a program stored in the ROM or the storage device 101 into the RAM and causing the CPU to execute the program. The processor 105 may cause the operating system (such as Windows, registered trademark) to implement a network communication unit 111 and a login processing unit 112, and may cause a driver program 101a to implement a driver 113. The operating system can cause the host terminal device 5 to participate in the directory service provided by the directory server device 4.

The network communication unit 111 controls the network interface 102 to perform data communications with the devices on the network 2 using various communication protocols.

The login processing unit 112 causes the directory server device 4 to perform the user authentication on the user of the host terminal device 5 and permits only a user who has succeeded in the user authentication to perform further operations after the login operation. In this case, at the start of the operating system on the host terminal device 5, the display device 103 is caused to display a login screen that prompts an input of user authentication information (such as a user ID and/or password). If the user authentication information is input to the input device 104, input user authentication information is identified, and the user authentication request and the user authentication information are transmitted to the directory server device 4. If the user authentication result from the directory server device 4 indicates a successful authentication, the display screen is caused to transition to a screen that can be operated by the user (for example, a desktop screen or a screen having a command prompt), that allows the further operations after the login operation (such as execution of an application, a utility, a driver, and the like). Meanwhile, if the user authentication result from the directory server device 4 indicates a failed authentication, the display of the login screen is continued, and the further operations are inhibited.

The driver 113 includes a ticket processing unit 121 and a job processing unit 122. The ticket processing unit 121 acquires the job ticket and the authorization information applied to the logged-in user from the user-manager server device 3 after the logged-in user has succeeded in the user authentication via the directory server device 4. The job processing unit 122 generates a job execution instruction responsive to the authorization information acquired by the ticket processing unit 121 and transmits the generated job execution instruction to the MFP 1A (and/or MFP 1B) along with the job ticket to execute the job. It should be noted that the job processing unit 122 transmits the user name (user ID) along with the job execution instruction as necessary. However, the job processing unit 122 does not transmit the user authentication information (that is, secret information necessary for login, such as a password) to the MFP 1A (and/or MFP 1B).

Figure 7:
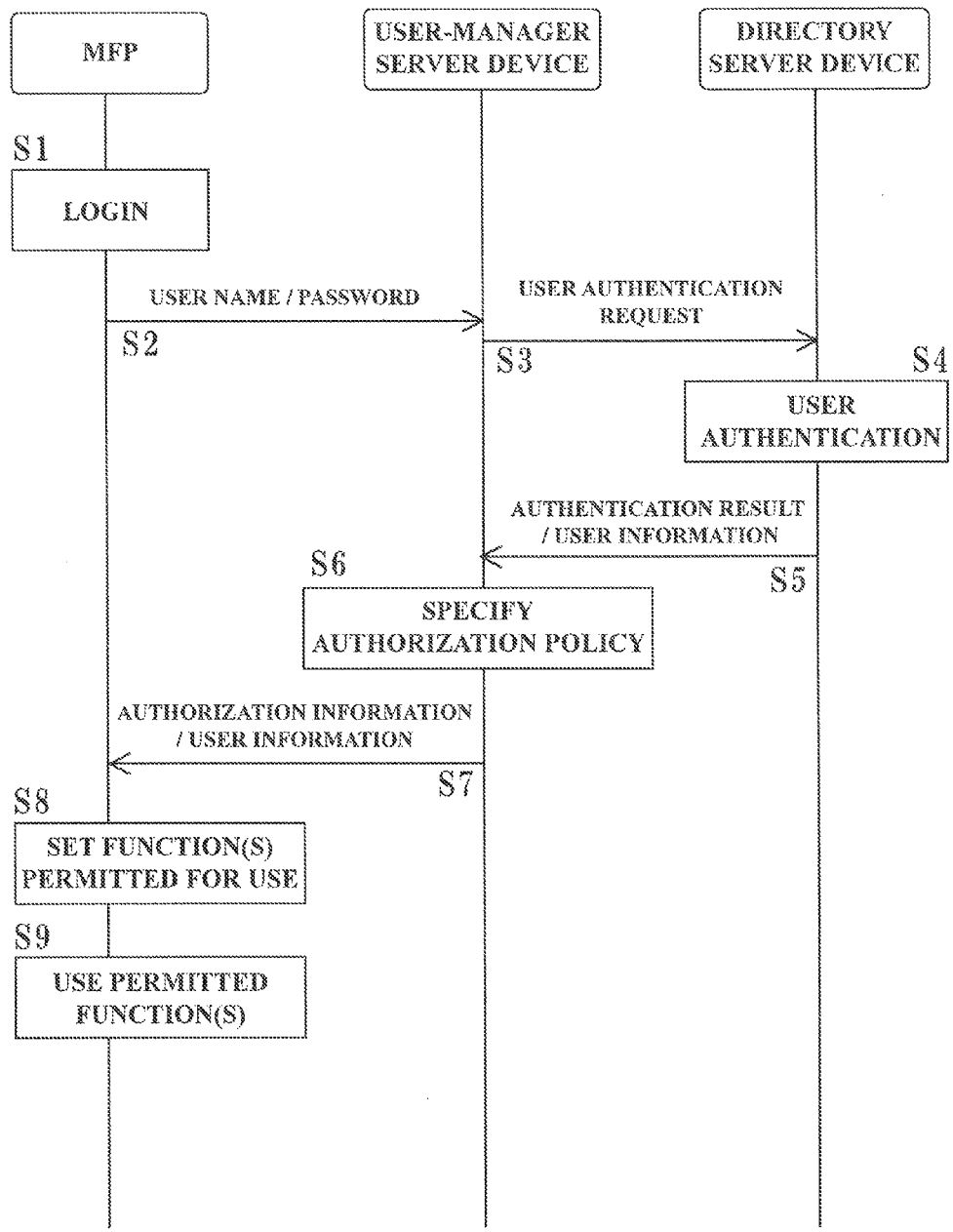
FIG. 7 is a sequence diagram illustrating an operation of each of apparatuses and devices when a user logs in to the MFP in the image forming system illustrated in FIG. 1.

FIG. 7 is a sequence diagram illustrating the operation of each of the apparatuses and the devices when the user logs in to the MFP 1A in the image forming system illustrated in FIG. 1. Each of the apparatuses and the devices illustrated in FIG. 7 would operate in a same or similar manner when a user logs in to the MFP 1B.

The operation panel 21 of the MFP 1A detects an operation of inputting a user name (the user ID) and a password performed by the user (S1). The control unit 33 causes the network communication unit 32 and the network interface 23 to transmit the user name and/or the password to the user-manager server device 3 (S2).

On the user-manager server device 3, the user authentication processing unit 62 causes the network communication unit 61 and the network interface 42 to receive the user name and/or the password and transmit the user name, the password, and an authentication request to the directory server device 4 using a predetermined protocol (for example, LDAP) (S3).

On the directory server device 4, the directory service processing unit 82 causes the network communication unit 81 and the network interface 72 to receive the user name, the password, and the authentication request by the predetermined protocol, and references the directory database 91 to determine whether or not the user name and/or the password belongs to a valid user (S4).

The directory service processing unit 82 causes the network communication unit 81 and the network interface 72 to transmit a determination (authentication) result (and, if the authentication is successful, the user information on the user), to the user-manager server device 3 as a response to the authentication request (S5).

On the user-manager server device 3, the user authentication processing unit 62 causes the network communication unit 61 and the network interface 42 to receive the authentication result as the response to the authentication request. If the authentication has been successful, the user authentication processing unit 62 receives the user information, and the authorization processing unit 63 references the authorization policy data 51 to specify the authorization information on the user (authorization policy to be applied to the user) (S6). The authorization processing unit 63 causes the network communication unit 61 and the network interface 42 to transmit a response indicating the successful authentication to the MFP 1A (and/or MFP 1B) in addition to the authorization information and the user information (S7).

On the MFP 1A, the control unit 33 causes the network communication unit 32 and the network interface 23 to receive the authorization information and the user information, and provides the authorization information to the determination unit 34 (S8). Based on the authorization information, the determination unit 34 sets, in the RAM, data indicating whether or not the user is permitted to use each of the functions that the MFP 1A provides.

The user is then permitted to use the MFP 1A with the functions limited according to the authorization information (S9). On the MFP 1A, the control unit 33 references the data set by the determination unit 34 to allow only a job that uses the functions permitted to the user, and executes the allowed job.

It should be noted that, if the user authentication has failed, only a response indicating an authentication failure is transmitted from the user-manager server device 3 to the MFP 1A. After receiving of the response indicating the authentication failure, the MFP 1A may display a message indicating the authentication failure onto the operation panel 21, and prohibit the user from using the MFP 1A.

Figure 8:
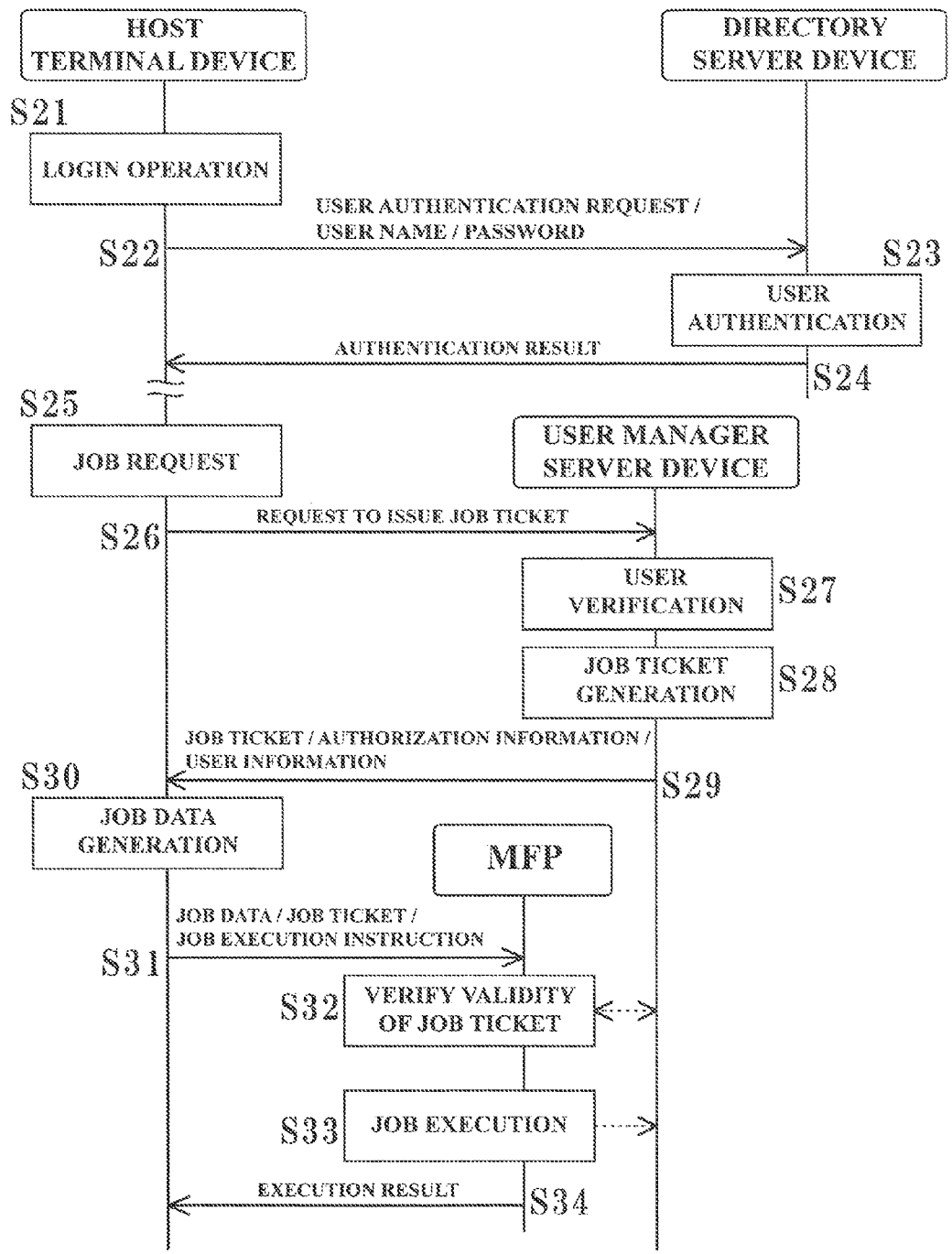
FIG. 8 is a sequence diagram illustrating a processing for causing the MFP to execute a job from the host terminal device in the image forming system illustrated in FIG. 1.

Described next is a process for causing the MFP 1A to execute a job from the host terminal device 5 in the image forming system. FIG. 8 is a sequence diagram illustrating the process for causing the MFP 1A to execute the job from the host terminal device in the image forming system of FIG. 1. It should be noted that a same or similar process may be used for causing the MFP 1B to execute a job from the host terminal device 5.

After the host terminal device 5 (and the operating system) is started, the login processing unit 112 causes the display device 103 to display the login screen. Once the user operates the input device 104 to input a user name (user ID) and/or a password onto the login screen, the login processing unit 112 identifies the user name (user ID) and/or the password that have been input (Step S21), and causes the network communication unit 111 and the network interface 102 to access the directory server device 4 via the network 2 and request that user authentication be performed on the user name (user ID) and/or the password (Step S22). The directory server device 4 determines whether or not the user name (user ID) and/or the password received along with the user authentication request match the user name (user ID) and/or the password of the user registered on the directory server device 4. The directory server device 4 transmits the user authentication result to the host terminal device 5 in response to the user authentication request (Step S24).

When the user authentication is successful, the user logs in to the directory server device 4 and is allowed to access a resource which is registered in the directory service and access the resource(s) which are permitted for the user. It should be noted that, when the user authentication fails, the user fails to log in to the directory server device 4 and cannot perform operations other than making a repeated login attempt.

When the driver program 101a is executed and the job processing unit 122 of the driver 113 detects the occurrence of a job request (for example, a request to print to the MFP 1A) based on a user operation or an instruction by an application program (Step S25), the ticket processing unit 121 transmits an issuance request for a job ticket to the user-manager server device 3 via the network 2 (Step S26). At the user-manager server device 3, after receiving of the job ticket issue request, the ticket issuance processing unit 64 causes the directory service to verify whether or not the user who has made the issue request has logged in to the directory server device 4 (Step S27). If the user who has made the issue request has logged in to the directory server device 4, the ticket issuance processing unit 64 generates the job ticket for the user (Step S28). Then, the ticket issuance processing unit 64 transmits the generated job ticket, the authorization information (the authorization policy for the user and/or the authorization policy for the group to which the user belongs) applied to the user, and user information (such as an electronic mail address) on the user to the host terminal device 5 via the network 2 (Step S29). It should be noted that, if the user who has made the issue request has not logged in to the directory server device 4, the ticket issuance processing unit 64 rejects the issue request and transmits a response indicating a failure in issuing the job ticket to the host terminal device 5.

After receiving the job ticket, the authorization information, and the user information, the ticket processing unit 121 temporarily saves the job ticket, the authorization information, and the user information in the RAM or the like. The job processing unit 122 generates the job execution instruction and the job data within the limits of the authorization information based on the job request of Step S25 (Step S30). For example, if a printing job is requested, and the authorization information inhibits color printing and permits monochrome printing, the job execution instruction and the job data for the monochrome printing are allowed to be generated, but the job execution instruction and the job data for the color printing are prevented from being generated. That is, the driver 113 inhibits the user from executing color printing (for example, grays out an item for the color printing to inhibit the color printing from being chosen from an option menu containing the items for, perhaps, both color printing and monochrome printing on a screen of the driver 113) based on the authorization information.

The job processing unit 122 then transmits the generated job execution instruction and the generated job data along with the job ticket to the MFP 1A via the network 2 (Step S31). It should be noted that, in the case of a job execution instruction for the printing job, page description language (PDL) data may also be transmitted as the job data, but in a case of a job execution instruction for scanning, job data may not be transmitted.

After receiving of the job execution instruction, the job data, and the job ticket, for example, the control unit 33 of the MFP 1A makes an inquiry to the user-manager server device 3 to verify the validity of the job ticket (Step S32). If the job ticket has been legally issued to the user (that is, the job ticket is valid), the control unit 33 executes the job corresponding to the job execution instruction (Step S33). If the job ticket is not valid, the control unit 33 rejects the job execution instruction and does not execute the job.

When the execution of the job is completed, the control unit 33 transmits an execution result to the host terminal device 5 via the network 2 (Step S34). In the case of the job execution instruction corresponding to a printing job, the execution result may include information as to whether or not the job has been normally completed. In the case of the job execution instruction corresponding to a scanning job, the execution result may include an image data file generated by a scanning operation. The job processing unit 122 of the host terminal device 5 receives the execution result via the network 2, and displays and saves the execution result corresponding to the type of the job. It should be noted that, in a case where the user-manager server device 3 collects and summarizes logs of the execution job from the MFPs 1A and 1B, the logs (in terms of the user name, the job type, and the like) of the execution job are transmitted to the user-manager server device 3.

As described above, by using the job ticket, it is not necessary to transmit the user authentication information to the MFP 1A to perform the login process to the MFP 1A, and hence only one login process to the directory server device 4 is necessary. Therefore, in the case of executing the job on the MFP 1A from the host terminal device 5 via the network 2, it is possible to limit the function used by the MFP 1A corresponding to the authorization information while maintaining the security and causing only one login process to be necessary.

The present disclosure includes various other embodiments. For example, other designs can be used in which the above-described components are each performed.

In the image forming system according to the present disclosure, an ID card (for example, an IC card) assigned to a user may be used instead of the user inputting his or her user name into the MFP 1A during user login.

An IC card reader may be connected to the MFP 1A, and when the ID card is brought to the IC card reader, the control unit 33 may use the IC card reader to read a card ID from the ID card. The control unit 33 may then transmit the card ID to the user-manager server device 3 with the password input in the same manner as in the above-described embodiment.

In the storage device 41 of the user-manager server device 3, conversion data is stored in which the card ID is associated with a user ID of the user to which the ID card is assigned. After receiving of the card ID and the password, the user authentication processing unit 62 references the conversion data to specify the user ID corresponding to the card ID, and causes the directory server device 4 to perform the user authentication based on the specified user ID and the received password.

While the IC card is used as the ID card in the above described example, a card including a recording medium of another format (for example, a magnetic card) may also or alternatively be used. In this case, a reader that can read the card ID from the card of the another format is used instead of the IC card reader. Further, biometric information such as a fingerprint may be used instead of the ID card. In this case, a reader that can acquire the biometric information from the user is used instead of the IC card reader, and a characteristic of a feature obtained from the biometric information is used as biometric ID.

In the above-described embodiment, the host terminal device 5 directly accesses the directory server device 4 to request the user authentication. However, in the same manner as the MFPs 1A and 1B, the host terminal device 5 may request the user authentication from the user-manager server device 3, and the user-manager server device 3 may cause the directory server device 4 to perform the user authentication.

In one embodiment, the IC card reader may be provided to the host terminal device 5, and the login to the directory server device 4 may be performed by using an ID card or the like. In that case, the user-manager server device 3 converts a card ID of the ID card into the user ID (user name).

In the above-described embodiment, the local users and the domain users coexist in the local group, but the local group may be formed of only local users or the local group may be formed of only domain users, or some combination thereof.

In the above-described embodiment, the user-manager server device 3 and the directory server device 4 may be configured to perform data communications via another network different from the network 2 by connecting the user-manager server device 3 to the another network instead of being connected to the network 2. It should be noted that, the host terminal device 5 is configured to have access to a network that provides access to the user-manager server device 3 and/or the directory server device 4.

In the above-described embodiment, the MFPs 1A and 1B are used as the image forming apparatuses, but a printer, a copier, and the like may additionally or alternatively be used. Further, while the illustrated image forming system includes two image forming apparatuses, the image forming system may alternatively include less than two or more than two image forming apparatuses.

An access right level to the MFP may be included in the authorization information. For example, one of the administrator and the general user is set as the access right level. In a case of the administrator, it is possible to use a function such as maintenance, which cannot be used by the general user.

In the above-described embodiment, the driver program may be recorded on a portable recording medium, and the driver program may be installed and/or executed from the recording medium onto the host terminal device 5.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system, comprising:
an image forming apparatus coupled to a network;
a host terminal device coupled to the network and configured to (i) provide an interface to allow a user to log-in, and (ii) cause the image forming apparatus to execute a job associated with the logged-in user;
a directory server device coupled to the network and configured to include registration information data on one of a domain group and a domain user,
wherein:
the host terminal device transmits authentication information corresponding to the logged-in user to the directory server device; and
the directory server device performs the authentication corresponding to the logged-in user based on the received authentication information and the registration information data on the one of the domain group and the domain user; and
a user-manager server device coupled to the network and configured to (i) store authorization information on one of a local group and a local user, (ii) responsive to determining that an authentication corresponding to the logged-in user has been successful, transmit to the host terminal device the authorization information and a job ticket indicating one or more permissions with respect to image forming apparatus functions that may be performed by a logged-in user;
wherein:
the host terminal device is further configured to generate a job execution instruction responsive to the authorization information, and transmit the job execution instruction and the job ticket to the image forming apparatus;
the image forming apparatus is further configured to (i) determine if the job ticket is valid and (ii) responsive to a determination that the job ticket is valid, execute the job specified by the job execution instruction;
the user-manager server device includes second registration information data on one of the local group and the local user that is separate from the registration information data on the directory server device, wherein the local group consists of local users and domain users, and wherein the local group consisting of the local users and the domain users is set; and
the user-manager server device is configured to (i) set the authorization information based on the second registration information data if the logged-in user belongs to the local group, (ii) set the authorization information based on the registration information data if the logged-in user does not belong to the local group, and (iii) generate, if the logged-in user belongs to the local group and to the domain group, and there is a plurality of authorization information applied to the logged-in user, the authorization information that prohibits use of a function, wherein the function is prohibited for use by at least one of the plurality of authorization information.

2. The image forming system according to claim 1, wherein:
the host terminal device transmits the authentication information corresponding to the logged-in user to the directory server device via the user-manager server device.

3. The image forming system according to claim 1, wherein the user-manager server device generates a unique job ticket based on the logged-in user's user ID and a one-time data using a predetermined function.

4. The image forming system according to claim 3, wherein the predetermined function includes a hash function.

5. The image forming system according to claim 3, wherein the one-time data includes a serial number having including one of a date and time of issuance of the request for the job ticket or one of a date and time of the job ticket generation.

6. The image forming system according to claim 1, wherein the host terminal device is further configured to receive an indication of the result of the job execution from the image forming apparatus.

7. A non-transitory computer-readable recording medium that stores a driver program to be executed on a host computing device connected to a network, the driver program, in response to execution by the computing device, causing the computing device to perform operations comprising:
authenticating a logged-in user to the host computing device;
transmitting authentication information corresponding to the logged-in user via the network to a directory server device that includes registration information data on one of a domain group and a domain user;
receiving an authentication result from the directory server device;
subsequent to the authenticating, receiving a job ticket, indicating one or more permissions with respect to image forming apparatus functions that may be performed by a logged-in user, from a user-manager server device coupled to the network that includes authorization information on one of a group and a user;
generating a job execution instruction responsive to the authorization information,
transmitting the job execution instruction and the job ticket to the image forming apparatus, and
causing the image forming apparatus to execute the job;
wherein:
the user-manager server device includes second registration information data on one of a local group and a local user that is separate from the registration information data on the directory server device, wherein the local group consists of local users and domain users, and wherein the local group consisting of the local users and the domain users is set; and
the user-manager server device is configured to (i) set the authorization information based on the second registration information data if the logged-in user belongs to the local group, (ii) set the authorization information based on the registration information data if the logged-in user does not belong to the local group, and (iii) generate, if the logged-in user belongs to the local group and to the domain group, and there is a plurality of authorization information applied to the logged-in user, the authorization information that prohibits use of a function, wherein the function is prohibited for use by at least one of the plurality of authorization information.

8. The non-transitory computer-readable recording medium according to claim 7, wherein:
transmitting the authentication information corresponding to the logged-in user to the directory server device comprises transmitting the authentication information to the directory server via the user-manager server device.

9. The non-transitory computer-readable recording medium according to claim 7, wherein a new job ticket is received each time a new job is to be executed.

10. The non-transitory computer-readable recording medium according to claim 7, wherein the operations further comprise transmitting the job ticket to the image forming apparatus without also transmitting a password corresponding to the logged-in user.

11. The non-transitory computer-readable recording medium according to claim 7, wherein the operations further comprise receiving, at the host computing device, an indication of the result of the job execution from the image forming apparatus.

12. An image forming method, comprising:
transmitting, from a host terminal device coupled to a network to a user-manager service device coupled to the network, a request to issue a job ticket responsive to a driver detecting a job request made by a logged-in user;
verifying, via a directory server device coupled to the network, whether or not authentication of the logged-in user has been successful, wherein the directory server device is configured to include registration information data on one of a domain group and a domain user;
responsive to detecting a successful authentication, generating, at the user-manager server device, a job ticket and transmitting the job ticket and authorization information corresponding to the logged-in user to the host terminal device via the network;
generating, at the host terminal device, a job execution instruction responsive to the authorization information and transmitting the job execution instruction and the job ticket to an image forming apparatus; and
determining, at the image forming apparatus, whether the job ticket is valid, and responsive to determining that the job ticket is valid, executing the job specified by the job execution instruction at the image forming apparatus;
wherein:
the user-manager server device includes second registration information data on one of a local group and a local user that is separate from the registration information data on the directory server device, wherein the local group consists of local users and domain users, and wherein the local group consisting of the local users and the domain users is set; and
the user-manager server device is configured to (i) set the authorization information based on the second registration information data if the logged-in user belongs to the local group, (ii) set the authorization information based on the registration information data if the logged-in user does not belong to the local group, and (iii) generate, if the logged-in user belongs to the local group and to the domain group, and there is a plurality of authorization information applied to the logged-in user, the authorization information that prohibits use of a function, wherein the function is prohibited for use by at least one of the plurality of authorization information.

13. The image forming method according to claim 12, further comprising transmitting, from the image forming apparatus, an inquiry to the user-manager server device to verify validity of the job ticket.

14. The image forming method according to claim 12, further comprising receiving, at the host terminal device, an indication of the result of the job execution from the image forming apparatus.

15. The image forming method according to claim 12, wherein the user-manager server device generates a unique job ticket based on the logged-in user's user ID and a one-time data using a predetermined function.

* * * * *